US012562187B2

(12) United States Patent　(10) Patent No.: US 12,562,187 B2
Glaess et al.　(45) Date of Patent: Feb. 24, 2026

(54) LOAD BEAM NESTING CONFIGURATION FOR HEAD STACK ASSEMBLY PROTECTION

(71) Applicant: Magnecomp Corporation, Murrieta, CA (US)

(72) Inventors: David Glaess, Bangkok (TH); Kuen Chee Ee, Chino, CA (US); Long Zhang, Winchester, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/726,763

(22) PCT Filed: Jan. 17, 2023

(86) PCT No.: PCT/US2023/010973
§ 371 (c)(1),
(2) Date: Jul. 3, 2024

(87) PCT Pub. No.: WO2023/141113
PCT Pub. Date: Jul. 27, 2023

(65) Prior Publication Data
US 2025/0069621 A1　Feb. 27, 2025

Related U.S. Application Data

(60) Provisional application No. 63/300,526, filed on Jan. 18, 2022.

(51) Int. Cl.
*G11B 5/48*　(2006.01)

(52) U.S. Cl.
CPC ................................. *G11B 5/4833* (2013.01)

(58) Field of Classification Search
None
See application file for complete search history.

(56) References Cited

U.S. PATENT DOCUMENTS

| | | | |
|---|---|---|---|
| 5,172,286 A | 12/1992 | Jurgenson | |
| 5,237,472 A * | 8/1993 | Morehouse | G11B 5/54 |
| 5,381,289 A * | 1/1995 | Fiedler | G11B 21/12 |
| 5,864,448 A * | 1/1999 | Berberich | G11B 5/54 |
| 6,151,197 A | 11/2000 | Larson et al. | |
| 6,292,333 B1 * | 9/2001 | Blumentritt | G11B 5/54 |
| 6,301,081 B1 | 10/2001 | Fahey | |
| 6,351,350 B1 * | 2/2002 | Symons | G11B 5/6005 |
| 8,976,491 B1 | 3/2015 | Chen et al. | |

(Continued)

OTHER PUBLICATIONS

International Preliminary Report on Patentability in International Application No. PCT/US2023/010973, mailed Aug. 2, 2024.

(Continued)

*Primary Examiner* — William J Klimowicz
(74) *Attorney, Agent, or Firm* — DLA Piper LLP (US)

(57)　ABSTRACT

Examples of a head stack assembly arm are described herein. The head stack assembly arm includes a load beam in an upper nesting configuration including a lift tab with an inner edge. The head stack assembly arm includes a load beam in a lower nesting configuration including a lift tab with an inner edge, the inner edge of the load beam in the lower nesting configuration is a different size from the inner edge of the load beam in the upper nesting configuration.

10 Claims, 5 Drawing Sheets

(56)    References Cited

U.S. PATENT DOCUMENTS

| | | | | |
|---|---|---|---|---|
| 11,056,137 | B1 * | 7/2021 | Teo ...................... | G11B 25/043 |
| 11,798,585 | B2 * | 10/2023 | Karasawa ............ | G11B 5/4833 |
| 12,380,920 | B2 * | 8/2025 | Zhang .................. | G11B 5/4833 |
| 2007/0008653 | A1 | 1/2007 | Ohno et al. | |
| 2014/0268426 | A1 * | 9/2014 | Hardy .................. | G11B 5/4833 |
| | | | | 360/245.2 |
| 2017/0309303 | A1 * | 10/2017 | Aoki .................... | G11B 5/4833 |
| 2019/0231311 | A1 * | 8/2019 | Kwon ................ | G01N 29/2406 |
| 2023/0326483 | A1 * | 10/2023 | Zhang .................. | G11B 5/4833 |
| | | | | 360/245.3 |

OTHER PUBLICATIONS

International Search Report and Written Opinion in International
Application No. PCT/US2023/010973, mailed Jun. 27, 2023.

* cited by examiner

*300*
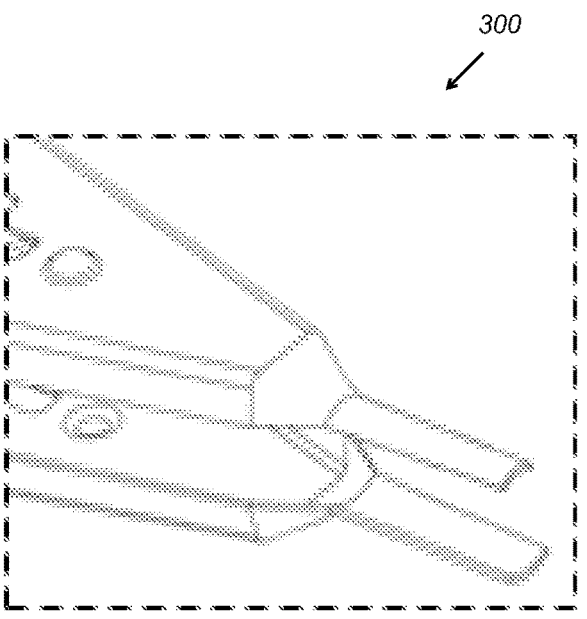
Figure 2A
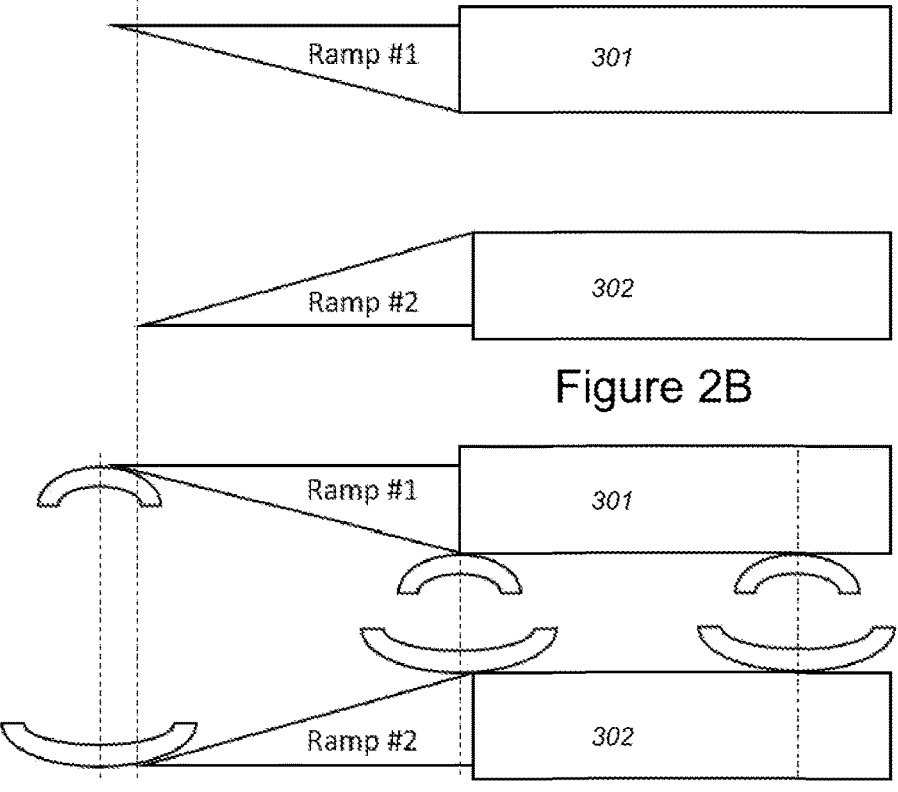
Figure 2B
Figure 2C

LOAD BEAM NESTING CONFIGURATION FOR HEAD STACK ASSEMBLY PROTECTION

CROSS-REFERENCE TO RELATED APPLICATIONS

This application is a United States National Stage Application filed under 35 U.S.C. § 371 of International Application No. PCT/US2023/010973 filed Jan. 17, 2023, which claims the benefit of, and priority to, U.S. Provisional Application No. 63/300,526 filed on Jan. 18, 2022, which is hereby incorporated by reference in its entirety.

FIELD

The present invention relates generally to an improved head stack assembly (HSA) arm and specifically to a nesting configuration for a head stack assembly.

BACKGROUND

A typical hard disk drive includes a head disk assembly (HDA) and a printed circuit board assembly (PCBA) attached to a hard disk drive base of the HDA. The HDA typically includes a disk drive base and a disk drive cover that together enclose at least one disk (such as a magnetic disk, magneto-optical disk, or optical disk), a spindle motor for rotating the disk, and a head stack assembly (HSA). The PCBA includes electronics for controlling the rotation of the spindle motor and for controlling the position of the HSA, and for providing a data transfer channel between the hard disk drive and its host.

The HSA includes an actuator arm, having an actuator arm tip to which a head gimbal assembly (HGA) is typically attached by a process known as swaging. The HGA typically includes a read/write head and a suspension assembly that suspends or supports the read/write head.

In common swage connections, the thickness of the actuator arm must be sufficient to accommodate the suspensions. As the number of the disks and suspensions increases in the hard disk drive to raise the capacity, the head stack arm thickness, ramp pitch and disk-to-disk clearance decreases to accommodate the disks and suspensions. With the decrease of the arm thickness, the load beam-to-load beam clearance will decrease. The decrease of load beam-to-load beam clearance may put the disk drive at a risk as the load beams may contact each other during lift-off shock and non-operation shock. Such metal-to-metal contact may scatter the metal particles onto the disk media and then cause drive failure. Thus, the amount which the distance between the disks can be reduced is limited, which limits the storage density of the unit.

Accordingly, there is a need for an improved head stack assembly and more particularly, an improved, low profile design which maximizes the clearance between suspensions as the thickness of the actuator arm is reduced.

SUMMARY

Examples of a head stack assembly (HSA) arm are described herein. The HSA arm may include a load beam in an upper nesting configuration including a lift tab with an inner edge. The HSA arm may also include a load beam in a lower nesting configuration including a lift tab with an inner edge, the inner edge of load beam in the lower nesting configuration is a different size from the inner edge of the load beam in the upper nesting configuration. In some embodiments the load beam in the upper nesting configuration and the load beam in the lower nesting configuration are coupled with a rigid anchor arm.

In some embodiments, the load beam in the lower nesting configuration is coupled with rigid anchor arm through a first base plate. Alternatively, the load beam in the upper nesting configuration is coupled with rigid anchor arm through a second base plate. The load beam in the upper nesting configuration and/or the lower nesting configuration may further include a slider connected to the load beam at the distal end via a flexure. The load beam in the upper nesting configuration and/or the lower nesting configuration may also include a pair of side rails configured to have a predetermined rigidity and load support capacity.

In some embodiments, the lift tab of the load beam in the upper nesting configuration is formed with a smaller lift tab width than the lift tab of the load beam in the lower nesting configuration. In some embodiments, the lift tab of the load beam in the upper nesting configuration is formed with a larger lift tab width than the lift tab of the load beam in the lower nesting configuration. In additional embodiments, the lift tab of the load beam in the upper nesting configuration is configured to have a width larger than the lift tab of the load beam in a lower nesting configuration, the lift tab of the load beam in the upper nesting and the load beam in the lower nesting configuration are configured to nest with each other.

In another aspect, a head stack assembly (HSA) arm is disclosed having a load beam in an upper nesting configuration including a lift tab with an inner edge; a load beam in a lower nesting configuration including a lift tab with an inner edge, the load beam in the upper nesting configuration and the load beam in the lower nesting configuration are asymmetric; and the load beam in the upper nesting configuration and the load beam in the lower nesting configuration are coupled with a rigid anchor arm.

In some embodiments, the inner edge of the load beam in the upper nesting configuration is aligned with a center of the inner edge of the load beam in the lower nesting configuration. Additionally, the load beam of the inner edge of the lower nesting configuration may be aligned with a center of the inner edge of the load beam in the upper nesting configuration.

In yet another aspect, a head stack assembly arm is disclosed including a first suspension including a load beam and at least one side rail configured to have a rigidity and load support capacity; and a second suspension including a load beam and at least one side rail configured to have a rigidity and load support capacity, the at least one side rail of the first suspension and the at least one side rail of the second suspension are asymmetric. In some embodiments, the at least one side rail of the first suspension and the at least one side rail of the second suspension are staggered. In some embodiments, the at least one side rail of the first suspension is a different size from the at least one side rail of the second suspension. In some embodiments, the first and/or second suspension includes a base plate connected to the load beam at a proximal end. In some embodiments, the second suspension includes a base plate connected to the load beam at a proximal end. The first and/or second suspension may be mounted to a rigid anchor arm at a proximal end. In some embodiments the load beam of the first suspension includes a lift tab with an inner edge; and the load beam of the second suspension includes a lift tab with an inner edge. The inner edge of the load beam of the first suspension may be of a different size from the inner edged of the load beam of the second suspension.

Other features and advantages of examples of the present disclosure will be apparent from the accompanying drawings and from the detailed description that follows.

BRIEF DESCRIPTION OF THE DRAWINGS

Examples of the present disclosure are illustrated by way of examples and not limitation in the figures of the accompanying drawings, in which like references indicate similar elements and in which:

FIG. 2A illustrates a perspective view of FIG. 1 in which the upper load beam lift tab has a footprint smaller than the lower load beam lift tab, according to an example of the disclosure;

FIG. 2B illustrates a side view of an upper ramp and a lower ramp design for the nested suspensions to park on during a non-operation mode, according to an example of the disclosure;

FIG. 2C illustrates cross-sections of the upper load beam lift tab and the lower load beam lift tab and the inner radius edges of the nested suspensions at points along the ramp, according to an example of the disclosure;

DETAILED DESCRIPTION

Examples of a head stack assembly (HSA) arm with nested suspensions are described herein. The HSA arm may include a load beam in an upper nesting configuration including a lift tab with an inner edge. The HSA arm may also include a load beam in a lower nesting configuration including a lift tab with an inner edge, the inner edge of the load beam in the lower nesting configuration is a different size from the inner edge of the load beam in the upper nesting configuration.

Figure 1:
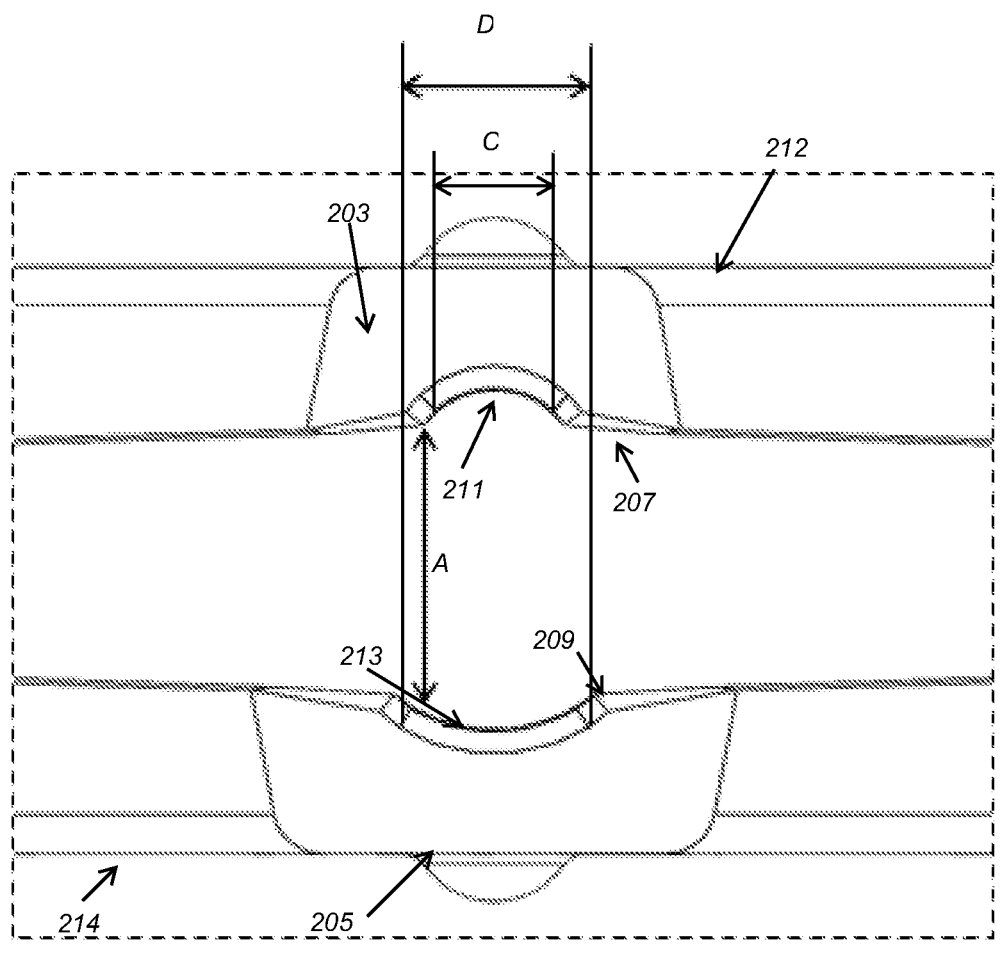
FIG. 1 illustrates a load beam in an upper nesting configuration and a load beam in a lower nesting configuration of an exemplary head stack assembly arm, according to an alternative example of the disclosure.

FIG. 1 illustrates a load beam in an upper nesting configuration 212 and load beam in a lower nesting configuration 214 of an exemplary head stack assembly (HSA) arm, according to an example of the disclosure. The load beam in the upper nesting configuration 212 includes an upper tab 203, which includes a lift tab 207 with an inner edge 211. The load beam in the lower nesting configuration 214 includes a down tab 205, which includes a lift tab 209 with an inner edge 213. The lift tab 207 may be formed with a lift tab width C, which is smaller than the lift tab width D of lift tab 209. As a result, the lift tab 207 can nest into the lift tab 209 during a shock event. Since the contact point will be within the inner edge 213, the lift tab-to-lift tab clearance A is increased compared to a conventional design and can provide more clearance margin.

FIG. 2A illustrates a perspective view of FIG. 1, showing the upper load beam lift tab and the lower load beam lift tab where the upper load beam lift tab is narrower than the lower load beam lift tab so that it appears that the upper load beam profile is within the lower load beam profile, according to an example of the disclosure. FIG. 2B illustrates the side view of the suspension ramp design for nested suspensions where the suspensions park during the non-operational mode. The upper ramp 301 and the lower ramp 302 are configured at the edges of the rotating disk. The suspensions slide onto the ramp and rest on the horizontal plane of ramp 301 and 302 at the same time similar to conventional design. FIG. 2C illustrates cross-sections of the upper load beam lift tab and the lower load beam lift tab and the inner radius edges of the nested suspensions at points along the ramp. In the beginning, the upper load beam lift tab that is narrower engages with ramp #1 at the proximal end and the lower load beam lift tab that is wider engages with ramp #2 at the proximal end. The two lift tabs slide along the ramps until the horizontal distal ends and stay at non-operational mode according to an example of the disclosure.

In some examples, the upper load beam lift tab half circle is narrower than the lower load beam lift tab half circle, the upper lift tab half-moon can crash into the inner surface of the lower lift tab half-moon during the shock event, as compared to the conventional design that the upper and lower load beams have identical lift tab width and the upper lift tab crashes to the lower lift tab half-moon at the edges under the shock event. As a result, the current invention allows the upper lift tab to travel more distance in the vertical direction under the shock event as shown in FIG. 1, which translates into less chance of the lift tab-to-lift tab contact and less metal particles generation.

Figure 3:
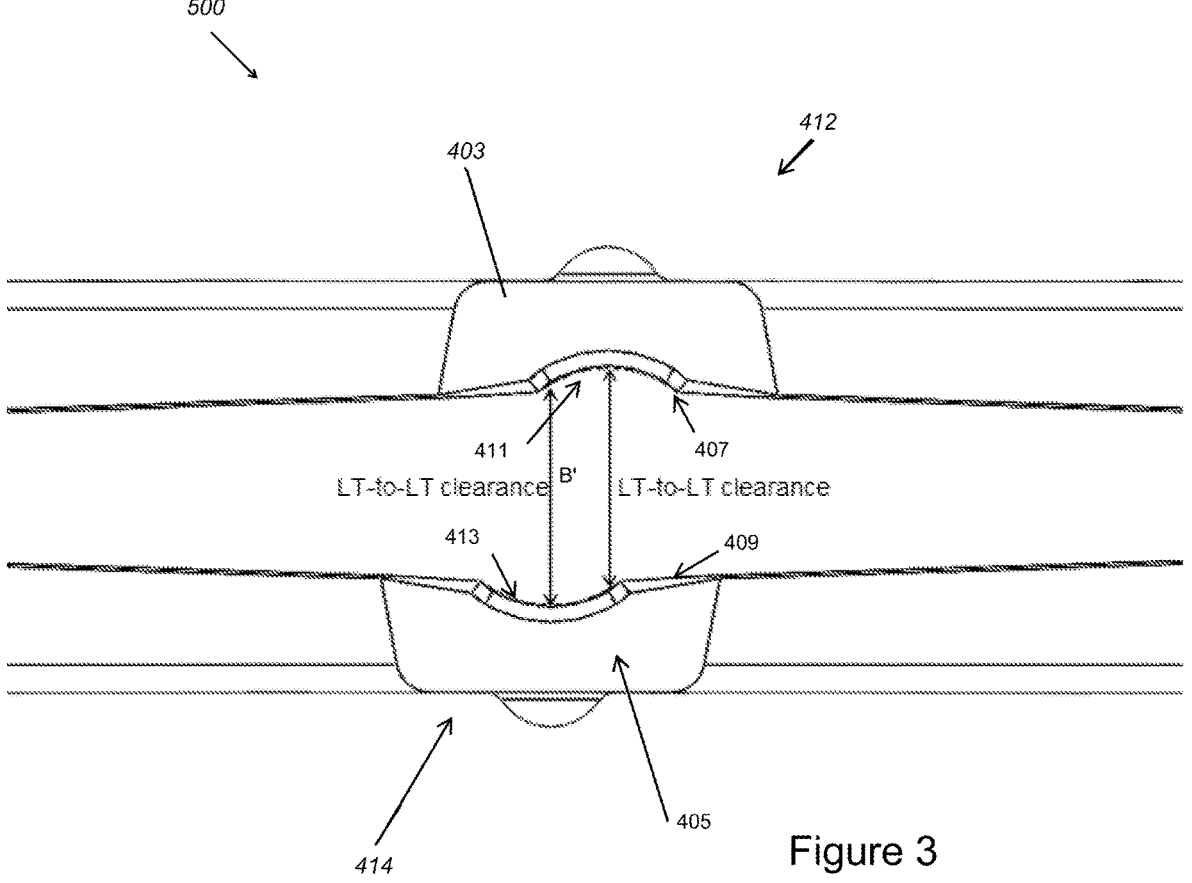
FIG. 3 illustrates an exemplary asymmetric load beams in an upper and a lower nesting configuration of an exemplary head stack assembly arm, according to an example of the disclosure.

FIG. 3 illustrates an exemplary asymmetric load beam in an upper nesting configuration 412 and load beam in a lower nesting configuration 414 of an exemplary head stack assembly arm 500, according to an example of the disclosure. The load beam in upper nesting configuration 412 includes an up tab 403, which includes a lift tab 407 with an inner edge 411. The load beam in lower nesting configuration 414 includes a down tab 405, which includes a lift tab 409 with an inner edge 413. The load beam in upper nesting configuration 412 and the load beam in lower nesting configuration 414 are asymmetric such that the inner edge 411 of the lift tab 407 is substantially aligned with the center of the lift tab of the inner edge 413. Moreover, the inner edge 413 of the lower lift tab 409 is substantially aligned with the center of the lift tab 407 inner edge 411.

As a result, the upper lift tab 407 and the lower lift tab 409 can nest into each other during a shock event. Since the contact point will be at the center of each half moon, the lift tab-to-lift tab (LT-to-LT) clearance B' can be increased to enable a greater clearance margin as compared against the conventional design that the contact point of the upper and lower lift tab is at the edges of the lift tab half-moon.

Figure 4:
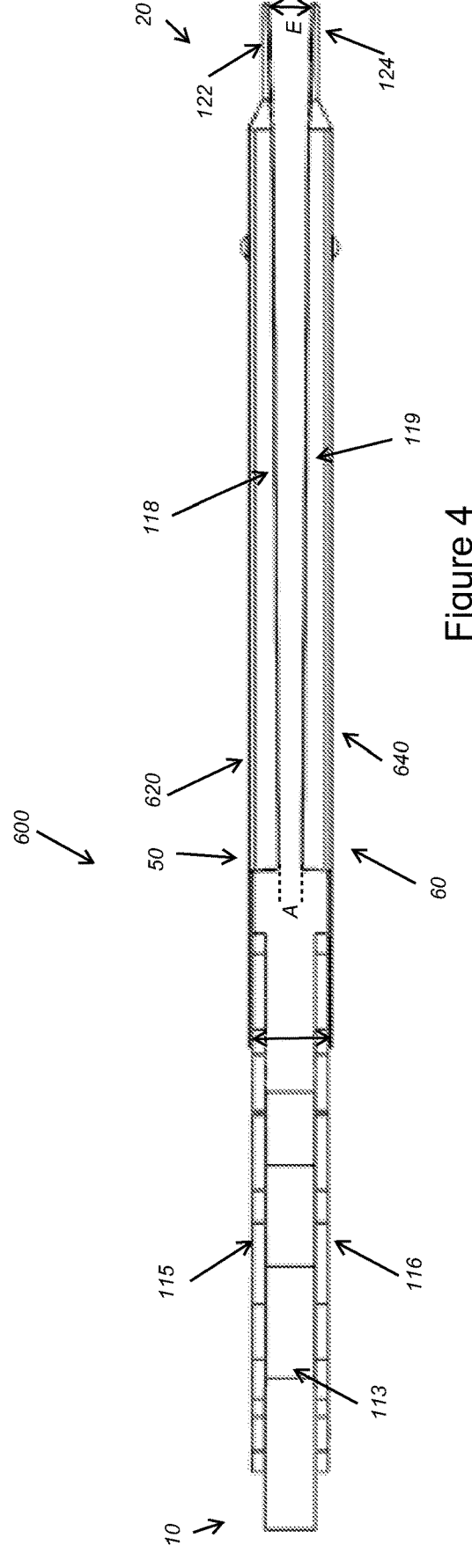
FIG. 4 illustrates the side view of the upper load beam and the lower load beam assembled onto the head stack arm, according to an example of the disclosure.

FIG. 4 illustrates the side view of an exemplary head stack assembly (HSA) arm 600 with nested load beam designs 620 and 640, according to an example of the disclosure. The HSA arm 600 includes a distal end 20, and a proximal end 10. The HSA arm 600 includes a first suspension 50 and a second suspension 60 adjacent to the first suspension. The two adjacent suspensions 50 and 60 may be mounted to a rigid anchor arm 113 at the proximal end 10. The two adjacent suspensions 50 and 60 may be positioned for movement between the load beam in an upper nesting configuration and the load beam in a lower nesting configuration at the distal end 20.

The first suspension 50 includes a load beam 620 and a base plate 115 or connection member connected to the load beam 620 at the proximal end 10. The first suspension 50 may also include a slider or read/write transducer head connected to the load beam 620 at the distal end 20 via a flexure, such as those known in the art.

The second suspension 60 includes a load beam 640 and a base plate 116 or connection member connected to the load beam 640 at the proximal end 10. The second suspension 60 may also include a slider or read/write transducer head connected to the load beam 640 at the distal end 20 via a flexure, such as those known in the art.

The load beam 620 of first suspension 50 may include a pair of side rails 118 configured to provide a predetermined rigidity and load support capacity to the first suspension 50. The load beam 640 of the second suspension 60 may include a pair of side rails 119 configured to have a predetermined rigidity and load support capacity to the second suspension 60.

In some examples, the load beams 620 and 640 are constructed of stainless steel. In some examples, the pairs of side rails 118 and 119 face away from one another in order to accommodate the reduced actuator arm thickness £2. In other examples, the pairs of side rails 118 and 119 face inwardly and the rigid anchor arm 113 has a thickness to accommodate the load beams 620 and 640.

Associated with each of the load beams 620 and 640 is a base plate or connector element 115 and 116, respectively. As the number of the disks and suspensions increases in the hard disk drive to raise the capacity, the rigid anchor arm 113 thickness 22 decreases to accommodate the disks and suspensions. The arm thickness 2 is one of the major parameters of a load beam-to-load beam clearance, including load beam rail clearance A. The arm thickness Q is also a major parameter to determine a lift tab clearance E between lift tabs 126 and 128. With the decrease of the rigid anchor arm 113 thickness (2, the load beam-to-load beam clearances A will also decrease. The load beam 620 and 640 configured according to techniques described above enable smaller arm thickness 52, ramp pitch and disk-to-disk clearance than current technologies, which enables the hard disk drives with more disks and hard disk drives having a smaller footprint than those using current technologies.

Figure 5:
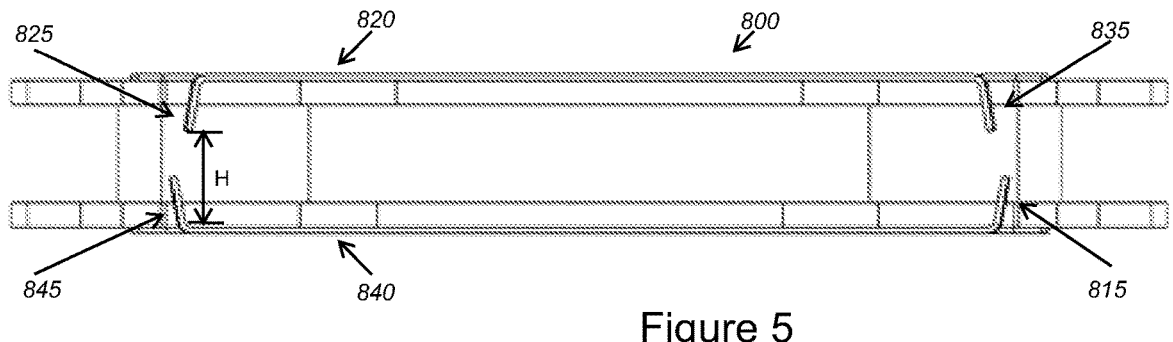
FIG. 5 illustrates an exemplary head stack assembly arm with asymmetric load beam rails, according to an example of the disclosure.

FIG. 5 illustrates the cross section view of an exemplary head stack assembly arm 113 with load beam rails in FIG. 4. A conventional design has small rail-to-rail clearance, where the rail of upper load beam and the rail of lower load beam may contact each other during the shock event. FIG. 5 also illustrates a nested load beam design with rail clearance H of the exemplary head stack assembly arm 800 with load beams 820 and 840, according to an example of the disclosure. Compared to a conventional design, the offset of rail 825 and 835 of upper load beam do not contact with the edge of rail 845 and 815 of lower load beam, but may travel more distance to contact with the inner surfaces of the lower rail 845 and 815 during the shock event. Thus, the H value is higher than the conventional rail clearance that is edge to edge contact.

Figure 6:
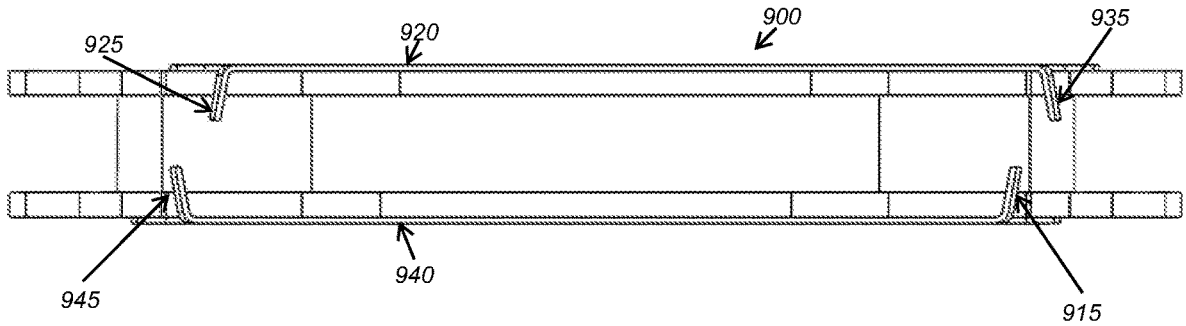
FIG. 6 illustrates an exemplary head stack assembly arm with staggered load beam rails, according to an example of the disclosure.

FIG. 6 illustrates another exemplary head stack assembly arm with asymmetrical nested load beam rails, according to an example of the disclosure. FIG. 6 illustrates an exemplary head stack assembly arm with load beams 920 and 940, according to an example of the disclosure. As compared against the conventional contact, the offset of rail 925 and

935 of upper load beam do not contact with the edge of rail 945 and 915 of lower load beam, the traveling distance is much larger than the conventional design during the shock event, which helps mitigate the chance of the contact between the upper and lower rails and then the metal particles generated from the crash.

It will be understood that terms such as "upper," "lower," "above," "best," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present disclosure" as used herein should not be construed to mean that only a single disclosure having a single essential element or group of elements is presented. Similarly, it will also be appreciated that the term "present disclosure" encompasses a number of separate innovations, which can each be considered separate disclosures. Although the present disclosure has been described in detail with regards to the preferred examples and drawings thereof, it should be apparent to those skilled in the art that various adaptations and modifications of examples of the present disclosure may be accomplished without departing from the spirit and the scope of the disclosure.

We claim:

1. A head stack assembly arm comprising:
   a load beam in an upper nesting configuration including a lift tab with an inner edge;
   a load beam in a lower nesting configuration including a lift tab with an inner edge, the inner edge of the load beam in lower nesting configuration is a different size from the inner edge of load beam in the upper nesting configuration; and
   the load beam in the upper nesting configuration and the load beam in the lower nesting configuration are coupled with a rigid anchor arm.

2. The head stack assembly arm of claim 1, wherein the load beam in the lower nesting configuration is coupled with rigid anchor arm through a first base plate.

3. The head stack assembly arm of claim 2, wherein the load beam in the lower nesting configuration includes a slider connected to the load beam at the distal end via a flexure.

4. The head stack assembly arm of claim 2, wherein the load beam in the lower nesting configuration includes a pair of side rails configured to have a predetermined rigidity and load support capacity.

5. The head stack assembly arm of claim 1, wherein the load beam in the upper nesting configuration is coupled with rigid anchor arm through a second base plate.

6. The head stack assembly arm of claim 5, wherein the load beam in the upper nesting configuration includes a slider connected to the load beam at the distal end via a flexure.

7. The head stack assembly arm of claim 5, wherein the load beam in the upper nesting configuration includes a pair of side rails configured to have a predetermined rigidity and load support capacity.

8. The head stack assembly arm of claim 1, wherein the lift tab of the load beam in the upper nesting configuration is formed with a smaller lift tab width than the lift tab of the load beam in the lower nesting configuration.

9. The head stack assembly arm of claim 1, wherein the lift tab of the load beam in the upper nesting configuration is formed with a larger lift tab width than the lift tab of the load beam in the lower nesting configuration.

10. The head stack assembly arm of claim 1, wherein the lift tab of the load beam in the upper nesting configuration is configured to have a width larger than the lift tab of the load beam in a lower nesting configuration, the lift tab of the load beam in the upper nesting and the load beam in the lower nesting configuration are configured to nest with each other.

\* \* \* \* \*